(12) United States Patent
Seward (10) Patent No.: US 10,447,822 B2
(45) Date of Patent: *Oct. 15, 2019

(54) DOTDOT GATEWAY

(71) Applicant: Silicon Laboratories Inc., Austin, TX (US)

(72) Inventor: DeWitt Clinton Seward, Arlington, VA (US)

(73) Assignee: Silicon Laboratories, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/626,618

(22) Filed: Jun. 19, 2017

(65) Prior Publication Data

US 2018/0367646 A1 Dec. 20, 2018

(51) Int. Cl.
*H04L 29/06* (2006.01)
*H04L 29/08* (2006.01)

(52) U.S. Cl.
CPC .............. *H04L 69/08* (2013.01); *H04L 67/12* (2013.01); *H04L 67/16* (2013.01); *H04L 69/329* (2013.01)

(58) Field of Classification Search
CPC .................. H04L 69/00–329; H04L 67/00–16
See application file for complete search history.

(56) References Cited

U.S. PATENT DOCUMENTS

| | | | |
|---|---|---|---|
| 7,779,111 B2 | 8/2010 | Shiraiwa et al. | |
| 9,178,749 B2 | 11/2015 | Levine et al. | |
| 10,057,382 B2 | 8/2018 | Sathyadevan et al. | |
| 2008/0056261 A1 | 3/2008 | Osborn et al. | |
| 2009/0198806 A1 | 8/2009 | Kim et al. | |
| 2011/0149932 A1 | 6/2011 | Kim et al. | |
| 2014/0313882 A1 | 10/2014 | Rucker et al. | |
| 2014/0359131 A1 | 12/2014 | Seed et al. | |
| 2015/0156349 A1* | 6/2015 | Fukushima | H04N 1/00344 358/1.15 |
| 2016/0164728 A1 | 6/2016 | Chakrabarti et al. | |
| 2016/0205078 A1 | 7/2016 | James et al. | |
| 2016/0380968 A1* | 12/2016 | Sarwar | H04W 88/16 709/245 |
| 2017/0279829 A1* | 9/2017 | Vasseur | H04L 41/0893 |
| 2018/0034914 A1* | 2/2018 | Christopher | H04L 69/08 |
| 2018/0262597 A1 | 9/2018 | Matthieu et al. | |
| 2019/0097842 A1 | 3/2019 | Seward et al. | |
| 2019/0098700 A1 | 3/2019 | Seward et al. | |
| 2019/0098701 A1 | 3/2019 | Seward et al. | |

OTHER PUBLICATIONS

Daniel Wroclawski, 2014, "We're losing the war for the smart home", Reviewed.com, pp. 1-8 (Year: 2014).*

(Continued)

*Primary Examiner* — Clayton R Williams
(74) *Attorney, Agent, or Firm* — Nields, Lemack & Frame, LLC (57) ABSTRACT

A system and method for allowing legacy devices to operate on a DotDot network is disclosed. The system includes a gateway device to interfaces between DotDot devices and legacy devices. In some embodiments, the gateway has a plurality of network interfaces to communicate with these devices. The gateway discovers the legacy devices that it can communicate with. The gateway device than enumerates these legacy devices in a manner that allows them to be accessed by the DotDot device. In certain embodiments, the gateway enumerates each legacy device as a DotDot endpoint.

16 Claims, 4 Drawing Sheets

(56) References Cited

OTHER PUBLICATIONS

William Wong, Jan. 17, 2017, "ZigBee DotDot Dashes to Unify Connectivity Stacks", ElectronicDesign.com, pp. 1-13 (Year: 2017).*

Corfield, "Dotdot. Who's there? Yet another IoT app layer", Jan. 4, 2017, pp. 1-3.

Hossen et al., "Interconnection between 802.15.4 Devices and 1Pv6: Implications and Existing Approaches", International Journal of Computer Science Issues, vol. 7, Iss. 1, No. 1, Jan. 2010. pp. 19-31.

Ovrebekk, "Why run 1Pv6 Over Bluetooth low energy?", Nordic Semiconductor, GetConnectedBlog—Your Guide to the Amazing World of IoT, via Archive.org—Wayback Machine, Snapshot captured Aug. 27, 2017, published Sep. 27, 2016.

Wang et al., "Internetworking Between ZigBee/802.15.4 and IPv6/802.3 Network", Sigcomm 2007 Workshop on IPv6 and the future of the internet in Kyoto, Japan. Aug. 2007.

Zigbee Cluster Library Specification, Revision 6, Jan. 14, 2016, pp. 1 & 45.

Office action dated Nov. 14, 2018 in co-pending U.S. Appl. No. 15/716,966.

Office action dated Nov. 14, 2018 in co-pending U.S. Appl. No. 15/717,008.

Final rejection dated Apr. 12, 2019 in co-pending U.S. Appl. No. 15/716,966.

Office action dated Feb. 6, 2019 in co-pending U.S. Appl. No. 15/716,999.

\* cited by examiner

DOTDOT GATEWAY

This disclosure describes systems and methods allowing non-DotDot devices to operate on a DotDot network.

BACKGROUND

The explosion of network connected devices has led to an increased use of certain protocols. ZigBee Cluster Library over IP (ZCLIP), also referred to as DotDot, is a new standard intended to improve the security and universal connectivity of the Internet of Things (IoT). As the adoption of DotDot continues to grow, there will be an entire set of infrastructure developed to allow communication between DotDot devices and the cloud, which includes PCs, smart phones, cloud servers and other devices.

However, there are already millions of devices that communicate wirelessly using other protocols, such as ZigBee®, BlueTooth, BLE and others. For example, ZIGBEE® is now commonly used in many applications, including utility meters, lighting systems and the like.

There is a need to find a way in which the currently existing devices, which do not utilize the DotDot protocol, can be included as part of a DotDot network. Obviously, retrofitting all of these existing devices with new software and possibly new hardware is not feasible for many reasons.

Therefore, there needs to be a system and method that allows these legacy devices to operate on a DotDot network, without requiring any changes to these legacy devices. However, there are now security requirements associated with the DotDot protocol that complicate this objective. Consequently, it would be beneficial to have a system and method that allows legacy devices to operate on a DotDot network without compromising the security of the DotDot network.

SUMMARY

A system and method for allowing legacy devices to operate on a DotDot network is disclosed. The system includes a gateway device to interface between DotDot devices and legacy devices. In some embodiments, the gateway has a plurality of network interfaces to communicate with these legacy devices. The gateway discovers the legacy devices that it can communicate with. The gateway device than enumerates these legacy devices in a manner that allows them to be accessible to the DotDot device. In certain embodiments, the gateway enumerates each legacy device as a DotDot endpoint.

According to one embodiment, a gateway device is disclosed. The gateway device comprises a DotDot network interface; a secondary network interface; a processing unit and a memory device, where the memory device comprises instructions, which when executed by the processing unit, allow the gateway device to: receive a message from a DotDot device using the DotDot network interface; translate the message to a legacy format; and transmit the translated message using the secondary network interface to a legacy device. In certain embodiments, the secondary network interface supports an IEEE 802.15.4 network protocol or a BLUETOOTH® network protocol. In some embodiments, the gateway device presents a Universal Resource Identifier, wherein each legacy device in communicate with the gateway device is presented as an endpoint in the gateway device. In certain further embodiments, the memory device further comprises instructions, which when executed by the processing unit, allow the gateway device to: communicate with legacy devices using the secondary network interface; query each legacy device to understand functionality of each legacy device; enumerate each function as an endpoint in a Universal Resource Identifier; and create an internal mapping between endpoint designation and each legacy device.

According to another embodiment, a method of configuring a legacy device to operate on a DotDot network is disclosed. The method comprises using a gateway device to communicate to the legacy device using a secondary network interface; enumerating the legacy device as a DotDot endpoint in the gateway device; creating a Universal Resource Identifier with the DotDot endpoint; and transmitting the Universal Resource Identifier to a DotDot device using a DotDot network interface. In certain embodiments, the gateway device creates an internal mapping associating the endpoint with the legacy device. In some embodiments, the method further comprises querying the legacy device to understand functionality of the legacy device; and wherein each function of the legacy device is enumerated as a DotDot endpoint.

According to another embodiment, a system is disclosed. The system comprises a device utilizing a DotDot protocol; a legacy device; and a gateway device, having a network interface to communicate with the device over a DotDot network, and a secondary network interface to communicate with the legacy device using a legacy network, and having a Universal Resource Identifier (URI), where the legacy device is listed as an endpoint in the URI. In certain embodiments, the secondary network interface utilizes an IEEE802.15.4 network protocol.

BRIEF DESCRIPTION OF THE DRAWINGS

For a better understanding of the present disclosure, reference is made to the accompanying drawings, in which like elements are referenced with like numerals, and in which.

DETAILED DESCRIPTION

As described above, DotDot is an emerging network protocol that allows communication over IP. While intended for wireless communications to support the Internet of Things (IoT), it is also usable over wired connections. The DotDot specification describes a generic application layer which can be used with different network stacks. For example, Thread is actively working on a network stack that is compatible with DotDot. DotDot defines an application layer. This application layer is similar to that already defined by the ZIGBEE® protocol. Stated differently, DotDot does not mandate a particular physical interface, but does mandate a specific application layer.

Figure 1:
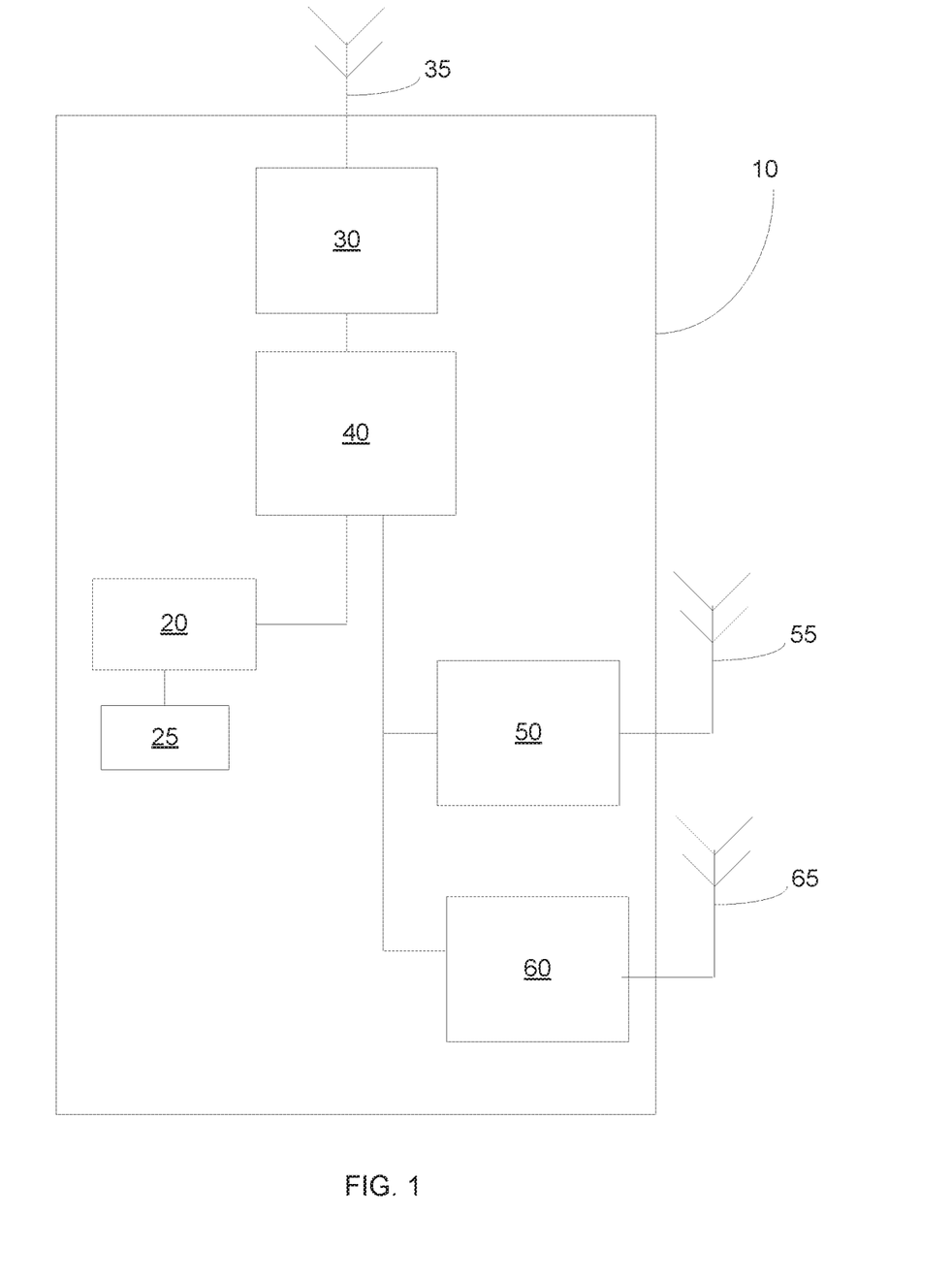
FIG. 1 is a block diagram of a gateway device according to one embodiment.

FIG. 1 shows a block diagram of a representative gateway device 10. The gateway device 10 has a processing unit 20 and an associated memory device 25. This memory device 25 contains the instructions, which, when executed by the processing unit 20, enable the gateway device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

The gateway device 10 also includes a DotDot network interface 30, which may be a wireless interface including an antenna 35. As stated above, DotDot defines an application layer. Therefore, the DotDot network interface 30 may be any interface that supports the IP protocol. For example, in certain embodiments, the DotDot network interface 30 may be an ethernet network controller. In other embodiments, the DotDot network interface 30 may be a WIFI network controller. In other embodiments, the DotDot network interface 30 may be a Thread network controller.

In other embodiments, the DotDot network interface 30 is a backhaul interface. In certain embodiments, this backhaul interface may be shared with other protocols, such as MQTT or IPSO. In other embodiments, the DotDot network interface 30 is dedicated to only one protocol, such as Ethernet or WIFI.

In this disclosure, the DotDot network interface 30 may be referred to as the primary network interface, while all other network interfaces are referred to as secondary network interfaces. Further, throughout this disclosure, the term "legacy device" is used to denote any device that does not use the DotDot protocol.

The gateway device 10 may include a second memory device 40 in which data that is received by the DotDot network interface 30, and data that is to be transmitted by the DotDot network interface 30, is stored. This second memory device 40 is traditionally a volatile memory. The processing unit 20 has the ability to read and write the second memory device 40 so as to communicate with the other nodes in the network. Although not shown, the gateway device 10 also has a power supply, which may be a battery or a connection to a permanent power source, such as a wall outlet.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language and is not limited by this disclosure. Thus, in some embodiments, there may be multiple computer readable media that contain the instructions described herein. The first computer readable media may be in communication with the processing unit 20, as shown in FIG. 1. The second computer readable media may be a CDROM, or a different memory device, which is located remote from the gateway device 10. The instructions contained on this second computer readable media may be downloaded onto the memory device 25 to allow execution of the instructions by the gateway device 10.

The gateway device 10 may also include a second network interface 50. This second network interface 50 may support any wireless network, including ZIGBEE®, Thread, BLUETOOTH®, BLE, a cellular protocol, such as 3G, GCM, CDMA, 4G, LTE, or other protocols. The second network interface 50 may include a second antenna 55.

In certain embodiments, the gateway device 10 may include a third network interface 60 with a third antenna 65. For example, the second network interface 50 may support ZigBee® and the third network interface 60 may support another wireless protocol, such as BLE or BLUETOOTH®. In fact, an arbitrary number of secondary network interfaces may be disposed on the gateway device 10. For example, there may be a plurality of secondary network interfaces to support ZigBee®, BLUETOOTH®, Thread, BLE and others.

Figure 2:
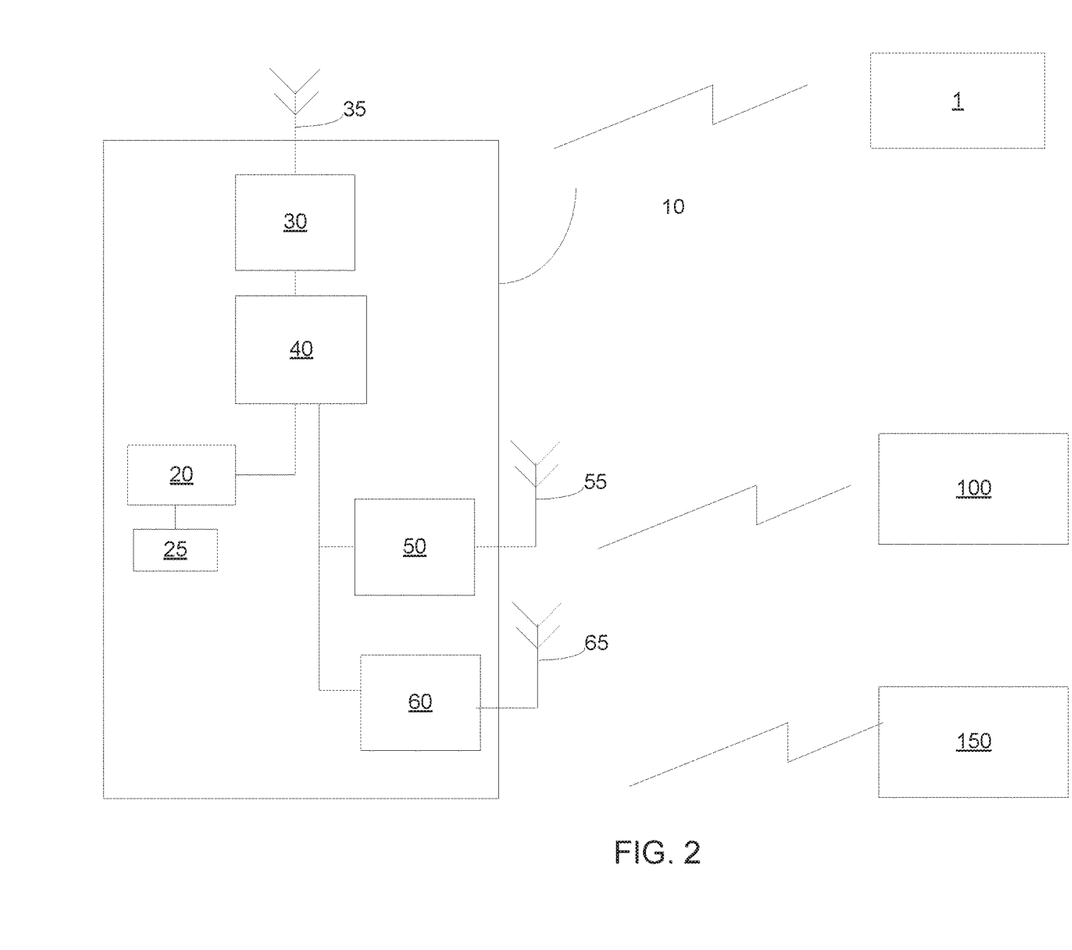
FIG. 2 shows the gateway device of FIG. 1 in one implementation.

It is well known within the art that a gateway device can communicate with nodes on that network. FIG. 2 shows the gateway device 10 in communication with a ZIGBEE® device 100. The gateway device 10 uses the existing ZIGBEE® standard to communicate with the ZIGBEE® device 100. As is well known, ZIGBEE® operates using the standard defined in IEEE 802.15.4. In other words, the IEEE 802.15.4 specification defines the physical and media access control layers of the network. The ZIGBEE® standard defines the higher level network protocols. The ZIGBEE® device 100 may be an end device or a sleepy device. The gateway device 10 serves as the parent node on the ZIBGBEE® network. The gateway device 10 may be a coordinator device or a router device. The second network interface 50 of the gateway device 10 provides the hardware support to communicate to the ZIGBEE® device 100.

FIG. 2 also shows the gateway device 10 in communication with a second network device 150. In certain embodiments, the third network interface 60 is used to communicate with the second network device 150. This second network device 150 may communicate using the BLUETOOTH® or BLUETOOTH® Low Energy (BLE) protocol, for example. In other embodiments, this second network device 150 may communicate using a different protocol, such as another protocol based on IEEE 802.15.4, such as Thread. In still other embodiments, the second network device 150 may not be present. In other embodiments, the ZIGBEE® device 100 is not present, and only the third network interface 60 is used. Further, the number of secondary network interfaces that may be disposed on the gateway device 10 is not limited by this disclosure. In other words, although the present disclosure describes a first network interface to communicate using the DotDot protocol and two secondary network interfaces, any number of secondary network interfaces may be employed. Further, the number of devices that communicate with the gateway device 10 is not limited by this disclosure.

In certain embodiments, network protocols that utilize the same physical layer, such as ZIGBEE® and Thread, which both utilize the physical and media access control layers defined in IEEE802.15.4, may be accessed using the same secondary network interface. In other embodiments, separate secondary network interfaces may be used for different protocols.

Finally, FIG. 2 shows the gateway device 10 in communication with another DotDot device 1. The gateway device 10 communicates with the DotDot device using the DotDot network interface 30. As described above, the DotDot network interface may be WIFI, Ethernet or another other communication mechanism that utilizes the IP protocol.

Figure 3:
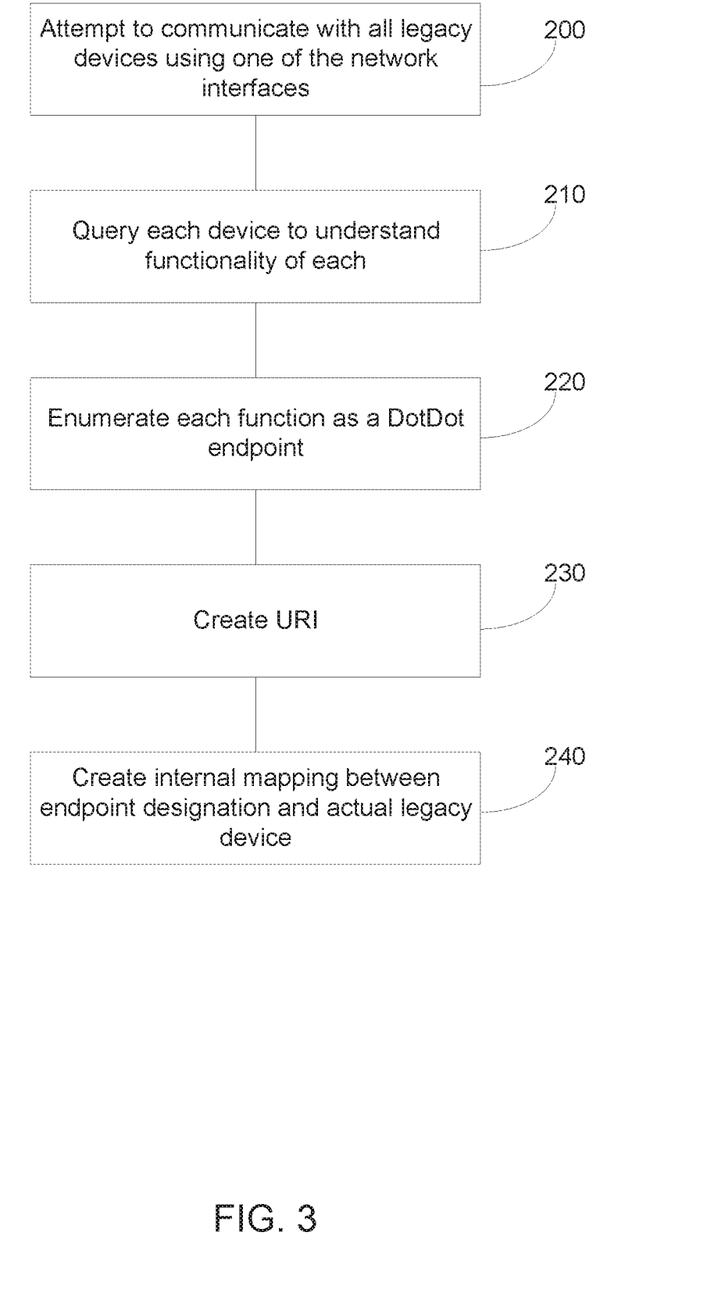
FIG. 3 illustrates a flowchart showing the initialization of the gateway device according to one embodiment.

FIG. 3 shows a representative flowchart showing the initialization of the gateway device 10. In operation, the gateway device 10 uses the second network interface 50 to attempt to communicate with the ZIGBEE® device 100, and any other ZIGBEE® devices within its listening range, as shown in Box 200. Once the gateway device 10 has enumerated all of the ZIGBEE® devices, it then queries each device to understand its functionality, as shown in Box 210. For example, some ZIGBEE® devices may be sensors, others may be lighting devices, and others may be switching devices to control the lighting devices. In certain embodiments, a ZIGBEE® device may have more than one function. For example, a ZIGBEE® device may be a combination occupancy sensor and thermostat device. Once the gateway device 10 has fully enumerated all of the devices in communication with the second network interface 50, and queried each device to understand its functions, it designates each of these functions as an endpoint in the gateway device 10, as shown in Box 220. The gateway device 10 also creates a Uniform Resource Identifier (URI) in memory, as shown in Box 230. The URI is a construct of the DotDot protocol. Each entry in the URI is in the format (endpoint ID, attribute ID, etc.). This URI defines the capabilities of each endpoint in the gateway device 10. In certain embodiments, a ZIG-BEE® device that has multiple functions may be enumerated as multiple endpoints in the gateway device 10. In certain embodiments, the URI may also contain information describing the network protocol used by each endpoint. However, in other embodiments, the fact that the endpoint is actually a legacy wireless device is kept hidden from the devices communicating over the DotDot network interface 30.

The gateway device 10 also maintains an internal mapping between the endpoint designation and the address of the ZIGBEE® device associated with that endpoint, as shown in Box 240. This internal mapping may include an indication of the protocol used by the endpoint (or the network interface to be used to connect to the ZIGBEE® device associated with that endpoint), the address of the ZIGBEE® device associated with that endpoint, and other parameters. In this way, when a DotDot device accesses an endpoint of the gateway device 10, the gateway device 10 is able to determine which external legacy device is associated with that endpoint.

This process is then repeated for each network interface disposed on the gateway device 10. Thus, if there is a third network interface 60, this sequence is repeated to identify all devices in communication with the third network interface 60. Further, if there are additional secondary network interfaces disposed on the gateway device 10, the process illustrated in FIG. 3 would be performed for each of those network interfaces.

Once the gateway device 10 has completed the initialization process shown in FIG. 3 for all of the network interfaces, it can then report its functionality to another node on the DotDot network, such as a mobile device, a cloud-based server, or any other gateway that presents itself as a DotDot device, including an actual DotDot gateway.

Once the gateway device 10 has been configured, it is able to be deployed in a DotDot network. Advantageously, it also allows the operation of existing wireless devices that do not support DotDot protocol.

For example, assume that the gateway device 10 reported that it had 9 endpoints. These endpoints may include a combination of legacy devices, such as ZIGBEE® devices, BLE devices, BLUETOOTH® devices, Thread devices and the like. These endpoints may also include functions that are internal to the gateway device 10. As an example, the endpoints may be defined as follows:

| Endpoint Number | Function |
|---|---|
| 1 | Legacy ZigBee device #1 - light bulb |
| 2 | Legacy ZigBee device #2 - light bulb |
| 3 | Legacy ZigBee device #3 - light bulb |
| 4 | Legacy ZigBee device #4 - switch |
| 5 | Legacy ZigBee device #5 - occupancy sensor |
| 6 | Legacy ZigBee device #5 - thermostat |
| 7 | Legacy BLE device - smart sensor |

-continued

| Endpoint Number | Function |
|---|---|
| 8 | DotDot device - running Thread protocol |
| 9 | Internal Function - network management |

This information is made available to other DotDot devices by means of the Constrained Application Protocol (CoAP) resources directory, as is standard practice for DotDot. Later, when another DotDot device wishes to check the temperature in a room, it may query Endpoint #6 of the gateway device 10. The gateway device 10, upon receipt of this packet, will use an internal mapping to determine that Endpoint #6 corresponds to a legacy ZIGBEE® device that can be accessed by second network interface 50. The gateway device 10 will then translate the DotDot packet so that it conforms to the ZIGBEE® application layer. The second network interface 50 will then transmit this translated packet to the corresponding legacy ZIGBEE® device. In this way, legacy ZIGBEE® devices are able to be controlled by a DotDot device without changing their functionality. Rather, the gateway device 10 performs the required translations and mappings to make this possible.

If a response is required, the second network interface 50 receives the response from the legacy ZIGBEE® device. The gateway device 10 then translates this response into the DotDot application layer protocol, and sends the response back to the DotDot device. For example, DotDot running over CoAP would leverage the 2.04 response message. In some embodiments, the response is sent in a separate packet, as would be the case for attribute reporting.

Figure 4:
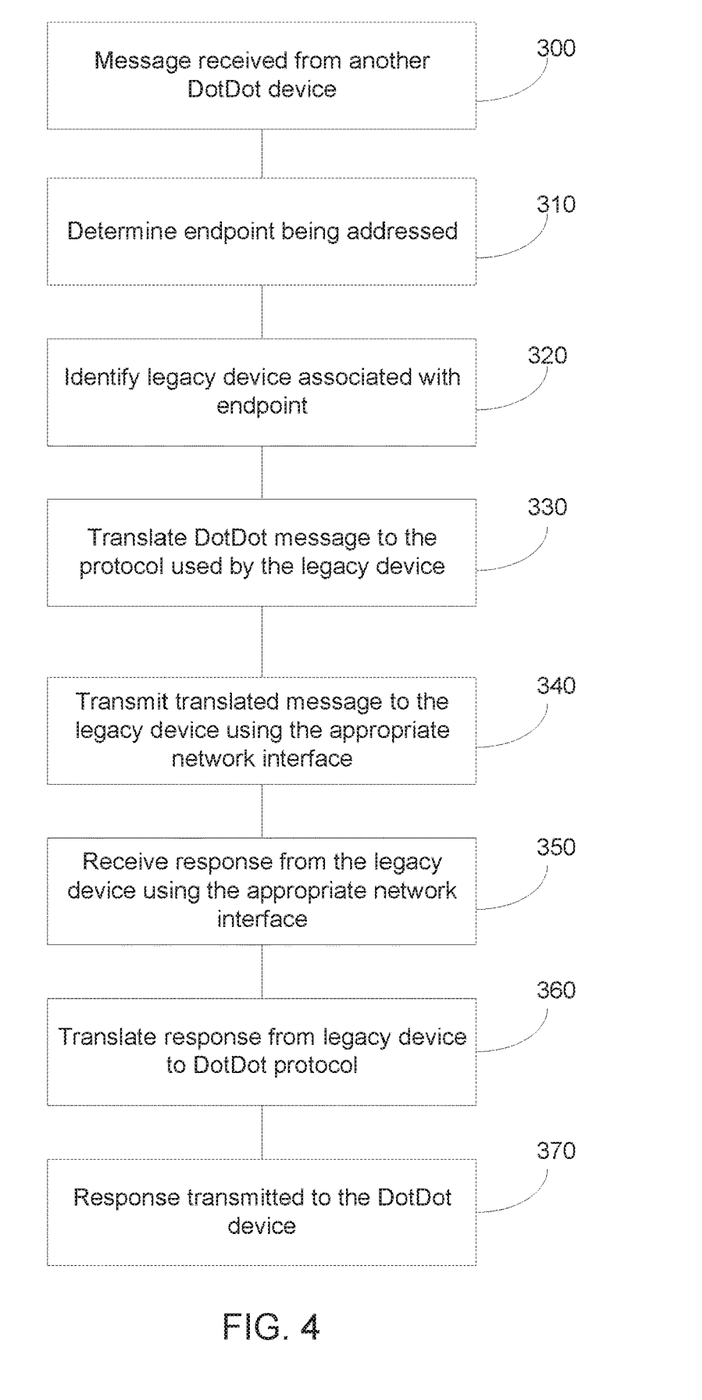
FIG. 4 illustrates a flowchart showing the operation of the gateway device according to one embodiment.

This process is shown in FIG. 4. First, as shown in Box 300, a DotDot message is received at the gateway device 10 from another DotDot device. The gateway device 10 first determines which endpoint is being addressed, as shown in Box 310. The gateway device 10 then uses its internal mapping to determine the actual identity of the legacy device that is associated with the addressed endpoint, as shown in Box 320. Having identified the legacy device that is actually being addressed, the gateway device 10 then translates the DotDot message into the protocol used by the legacy device, as shown in Box 330. The gateway device 10 then transmits the translated message over the appropriate network interface to the legacy device, as shown in Box 340.

If a response from the legacy device is required, the gateway device 10 receives that response, as shown in Box 350. The gateway device 10 then translates the response from the legacy device to the DotDot protocol, as shown in Box 360. The gateway device 10 then transmits the response to the DotDot device, as shown in Box 370. The gateway device 10 will identify the response as originating at the endpoint originally addressed by the DotDot device in Box 300.

Certain legacy network protocols, such as ZIGBEE®, BlueTooth, and BLE may use physical connections that are different from those present on the DotDot network interface 30. In addition, these network protocols may utilize different network stacks than that used by the DotDot protocol. For those network protocols, the gateway device 10 needs to provide translation functionality, whereby the gateway device 10 converts packets from the DotDot protocol, which are addressed to a particular endpoint in the gateway device 10, to a completely different network protocol. Thus, in the example shown above, any access to Endpoints 1-7 requires the gateway device 10 to translate the packet to a different protocol, having a different network layer and a different application layer.

However, certain network protocols may be very similar to the application layer used by the DotDot protocol, and may also utilize the IP protocol. For example, Thread utilizes the IP protocol operating on a network that utilizes the physical and media access control layers defined in IEEE 802.15.4. Specifically, Thread utilizes the IPv6 protocol.

If the DotDot network also uses IPv6, then the DotDot devices are able to locate and route packets to the Thread device located behind the gateway device 10. In this embodiment, the gateway device 10 only needs to transmit the IPv6 packet over a different physical layer. In other words, the gateway device 10 simply needs to retransmit the packet using a different physical layer. Thus, in this embodiment, the gateway device 10 acts as a border router for the Thread device. Furthermore, in this embodiment, the Thread device may not be listed as an Endpoint of the gateway device 10.

However, if the DotDot network uses IPv4, then the DotDot devices are not able to locate and route packets to the Thread device located behind the gateway device 10. In this embodiment, the gateway device 10 needs to convert the IPV4 address used by the DotDot device into an IPV6 address for the Thread device. Additionally, the gateway device 10 needs to transmit the packet over a different physical layer. Thus, in this embodiment, because the addressing is different between the DotDot protocol and the Thread device, the Thread device would be listed as an Endpoint of the gateway device 10, as is shown in the Table above.

Furthermore, the DotDot network interface 30 is described as being any network that utilizes the IP protocol. It is noted that Thread is one such network. Thus, in some embodiments, the DotDot network interface 30 may support IEEE802.15.4 so as to support Thread.

This system has the benefit of allowing existing devices to be used as the migration toward DotDot continues. Thus, rather than having to replace these legacy devices, gateway devices allow these devices to remain fully operational.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A gateway device, comprising:
a DotDot network interface;
a secondary network interface, supporting a network protocol different from DotDot;
a processing unit and a memory device, where the memory device comprises instructions, which when executed by the processing unit, allow the gateway device to:
communicate with legacy devices using the secondary network interface;
query each legacy device to understand functionality of each legacy device;
enumerate each function of each legacy device as a DotDot endpoint in a Universal Resource Identifier located in the memory device, wherein the Universal Resource Identifier is defined by the DotDot protocol and has a format that includes an endpoint ID and an attribute ID;
create an internal mapping between each of the DotDot endpoint designations and a corresponding legacy device;
receive a message from a DotDot device using the DotDot network interface;
identify a destination legacy device based on the endpoint designation contained in the message;
translate the message to a legacy format; and
transmit the translated message using the secondary network interface to the identified destination legacy device.

2. The gateway device of claim 1, wherein the secondary network interface supports an IEEE802.15.4 network protocol.

3. The gateway device of claim 1, wherein the secondary network interface supports a BLUETOOTH® network protocol.

4. A method of configuring a legacy device to operate on a DotDot network, comprising:
using a gateway device, wherein the gateway device comprises a DotDot network interface and a secondary network interface that supports a network protocol different from DotDot, to communicate to the legacy device using the secondary network interface;
querying the legacy device to understand functionality of the legacy device;
enumerating each function of the legacy device as a DotDot endpoint in the gateway device;
creating an internal mapping in the gateway device associating each of the DotDot endpoints with the legacy device;
creating a Universal Resource Identifier for each of the DotDot endpoints, wherein each of the Universal Resource Identifiers is defined by the DotDot protocol and has a format that includes an endpoint ID and an attribute ID; and
transmitting the Universal Resource Identifiers to a DotDot device using the DotDot network interface.

5. The method of claim 4, further comprising configuring a second legacy device to operate on the DotDot network by:
using the gateway device to communicate to the second legacy device using a second secondary network interface;
enumerating the second legacy device as a second DotDot endpoint in the gateway device; and
creating a Universal Resource Identifier with the second DotDot endpoint.

6. The method of claim 5, wherein the second secondary network interface is different than the secondary network interface.

7. The method of claim 5, wherein the secondary network interface utilizes a ZIGBEE® protocol.

8. The method of claim 7, wherein the second secondary network interface utilizes a BLUETOOTH® or Thread protocol.

9. The method of claim 4, wherein the secondary network interface utilizes Thread protocol with an IPv6 network protocol and the DotDot network utilizes an IPv4 network protocol.

10. A system, comprising:
a device utilizing a DotDot protocol;
a legacy device; and
a gateway device, having a network interface to communicate with the device over a DotDot network, and a secondary network interface to communicate with the legacy device using a legacy network that supports a network protocol different from the DotDot network, and having Universal Resource Identifiers (URI), wherein the gateway device, further comprising a processing unit and a memory device, where the memory device comprises instructions, which when executed by the processing unit, allow the gateway device to:
communicates with the legacy device using the secondary network interface;
queries the legacy device to understand functionality of the legacy device;
enumerates each function of the legacy device as a DotDot endpoint in the URI in the gateway device, wherein each of the URIs is defined by the DotDot protocol and has a format that includes an endpoint ID and an attribute ID;
creates an internal mapping between each of the DotDot endpoint designations and the legacy device;
receives a message from a device using the DotDot network;
identifies a legacy device based on an endpoint designation contained in the message;
translates the message to a legacy format; and
transmits the translated message using the secondary network interface to the legacy device.

11. The system of claim 10, wherein the secondary network interface supports an IEEE802.15.4 network protocol.

12. The system of claim 11, wherein the legacy network utilizes ZIGBEE® protocol.

13. The system of claim 11, where the legacy network utilizes Thread protocol with an IPv6 network protocol and the DotDot network utilizes an IPv4 network protocol.

14. The system of claim 10, wherein the DotDot network utilizes WIFI or Ethernet protocol.

15. The system of claim 10, further comprising a second legacy device, where the second legacy device is listed as a second endpoint in the URI.

16. The system of claim 15, wherein the gateway device comprises a second secondary network interface, using a second legacy network different from the legacy network.

* * * * *